US008268173B2

(12) United States Patent
Bundgaard et al.

(10) Patent No.: US 8,268,173 B2
(45) Date of Patent: Sep. 18, 2012

(54) CONTROLLED AERATION OF INTEGRATED FIXED-FILM ACTIVATED SLUDGE BIOREACTOR SYSTEMS FOR THE TREATMENT OF WASTEWATER

(75) Inventors: Erik Bundgaard, Vanloese (DK); Richard E. DiMassimo, Raleigh, NC (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 284 days.

(21) Appl. No.: 12/783,807

(22) Filed: May 20, 2010

(65) Prior Publication Data
US 2011/0284461 A1 Nov. 24, 2011

(51) Int. Cl.
*C02F 3/00* (2006.01)
(52) U.S. Cl. .................. 210/614; 210/616; 210/620
(58) Field of Classification Search .................. 210/614, 210/616, 620
See application file for complete search history.

(56) References Cited

U.S. PATENT DOCUMENTS

| 6,312,599 | B1 | 11/2001 | Reid |
| 2007/0175823 | A1 | 8/2007 | Cheuk et al. |
| 2008/0283469 | A1 | 11/2008 | Pollock |
| 2009/0283472 | A1 | 11/2009 | Gerardi et al. |

OTHER PUBLICATIONS

Thomas, et al.; "Evaluation of Nitrification Kinetics for a 2.0 MGD IFAS Process Demonstration"; Nutrient Removal 2009; Water Environment Federation; 2009; pp. 97-116.
International Search Report mailed Aug. 15, 2011 in re International Application No. PCT/US2011/036594.

*Primary Examiner* — Chester Barry
(74) *Attorney, Agent, or Firm* — Coats & Bennett, P.L.L.C.

(57) ABSTRACT

A method of biologically treating wastewater with an integrated fixed film activated sludge process. The integrated fixed film activated sludge process includes biomass suspended in mixed liquor and biomass disposed on carriers. Under certain conditions the dissolved oxygen concentration in a reactor that includes the mixed liquor, biomass suspended in the mixed liquor, and the biomass on the carriers, biological treatment is performed primarily by the biomass in the mixed liquor. This is achieved by controlling or maintaining the dissolved oxygen concentration in the reactor at a relatively low concentration. When the biomass suspended in the mixed liquor is unable to adequately biologically treat the mixed liquor, the dissolved oxygen concentration in the reactor is controlled or maintained at a relatively high concentration. This enables biomass on the carriers to contribute more to the biological treatment of the mixed liquor than when the dissolved oxygen concentration was maintained relatively low.

27 Claims, 4 Drawing Sheets

CONTROLLED AERATION OF INTEGRATED FIXED-FILM ACTIVATED SLUDGE BIOREACTOR SYSTEMS FOR THE TREATMENT OF WASTEWATER

FIELD OF THE INVENTION

The present invention is related to wastewater treatment processes wherein aeration is utilized to promote biological treatment of the wastewater. More specifically, the invention relates to controlling aeration in multiple modes of operation of a biological wastewater treatment reactor wherein the modes are associated with substantially different aeration levels.

BACKGROUND

Wastewater treatment systems are designed to remove contaminants from wastewater. For many years, many wastewater treatment systems have been designed for biological treatment. For example, biological treatment is utilized to remove BOD from the wastewater. Another example of biological treatment involves removing ammonia from wastewater. This is referred to as nitrification and denitrification. Another example of biological treatment is the use of microorganisms to remove phosphorus from wastewater.

More particularly, biological organisms or microbes generally extant in wastewater can be stimulated to perform wastewater treatment processes by consuming waste materials, and in some cases, producing other materials or compounds that are acceptable, or that can be subsequently removed from the wastewater.

Generally, sustained activation of microbial populations in wastewater requires oxygen, in that most of the organisms are aerobic in nature. Commonly, oxygen is provided by aerating the wastewater. Aeration may be done in various ways. However, typical approaches to aeration can be costly in terms of the energy required to operate pumps, compressors, agitators, stirrers, and the like. Minimizing energy costs is a major factor in the operation of wastewater treatment plants, and aeration costs can be a major part of total wastewater treatment plant energy costs.

There has been and continues to be a need for biological wastewater treatment systems and processes that control aeration and provide for an efficient cost-effective means for biologically treating wastewater.

SUMMARY OF THE INVENTION

The present invention relates to a process for biologically treating wastewater utilizing an integrated fixed film activated sludge process. By the traditional operation of such plants the mixing of the media with the mixed liquor and the wastewater is continuously ensured by intensive aeration which also ensure sufficient oxygen level to ensure biological activity on the media. In this method, wastewater is mixed with activated sludge to form mixed liquor. The mixed liquor is treated in a reactor having biomass disposed on media or carriers and also having biomass suspended in the mixed liquor. The aeration to the reactor having the mixed liquor is varied so as to efficiently aerate and supply dissolved oxygen to the mixed liquor. In one mode of operation, the aeration and dissolved oxygen concentration is maintained relatively low because the biomass suspended in the mixed liquor is sufficient to primarily carry out the required biological treatment. During such conditions the carriers are typically floating in the upper section of the biological reactor and are not taking part in the purification/treatment process of the wastewater. In a second mode of operation, the aeration to the reactor is increased and this effectively increases the dissolved oxygen concentration in the reactor which increases the biological activity of the biomass on the carriers which in turn generally increases the contribution of the biomass on the carriers to the biological treatment, and the carriers are generally evenly distributed in the reactor due to the higher aeration activity.

In one particular embodiment of the present invention, a method of biologically treating wastewater utilizing an integrated fixed film activated sludge process is provided. Here, the method includes mixing the wastewater with activated sludge to form mixed liquor. The mixed liquor is biologically treated in a reactor that includes biomass on the carriers and biomass suspended in the mixed liquor. The amount of biomass on the carriers will vary depending on temperature and the loading of organic matter and ammonia nitrogen in relation to the amount of activated sludge in the system (MLSS). The method includes controlling the dissolved oxygen concentration in the reactor in such a way that the biomass on the carriers is only removing pollutants (organic matter and ammonia) when the mixed liquor is not able to handle the complete treatment by itself. i.e., the carriers are only "working" when required. The dissolved oxygen concentration in the reactor is maintained relatively low when the biomass in the mixed liquor can perform the required biological treatment. Under certain conditions the biomass in the mixed liquor is unable to biologically treat the wastewater without substantial contributions from the biomass on the carriers. When this is the case, the dissolved oxygen concentration in the mixed liquor is raised and this enables the biomass on the carriers to substantially contribute to the biological treatment of the wastewater.

Other objects and advantages of the present invention will become apparent and obvious from a study of the following description and the accompanying drawings which are merely illustrative of such invention.

DETAILED DESCRIPTION

Figure 1:
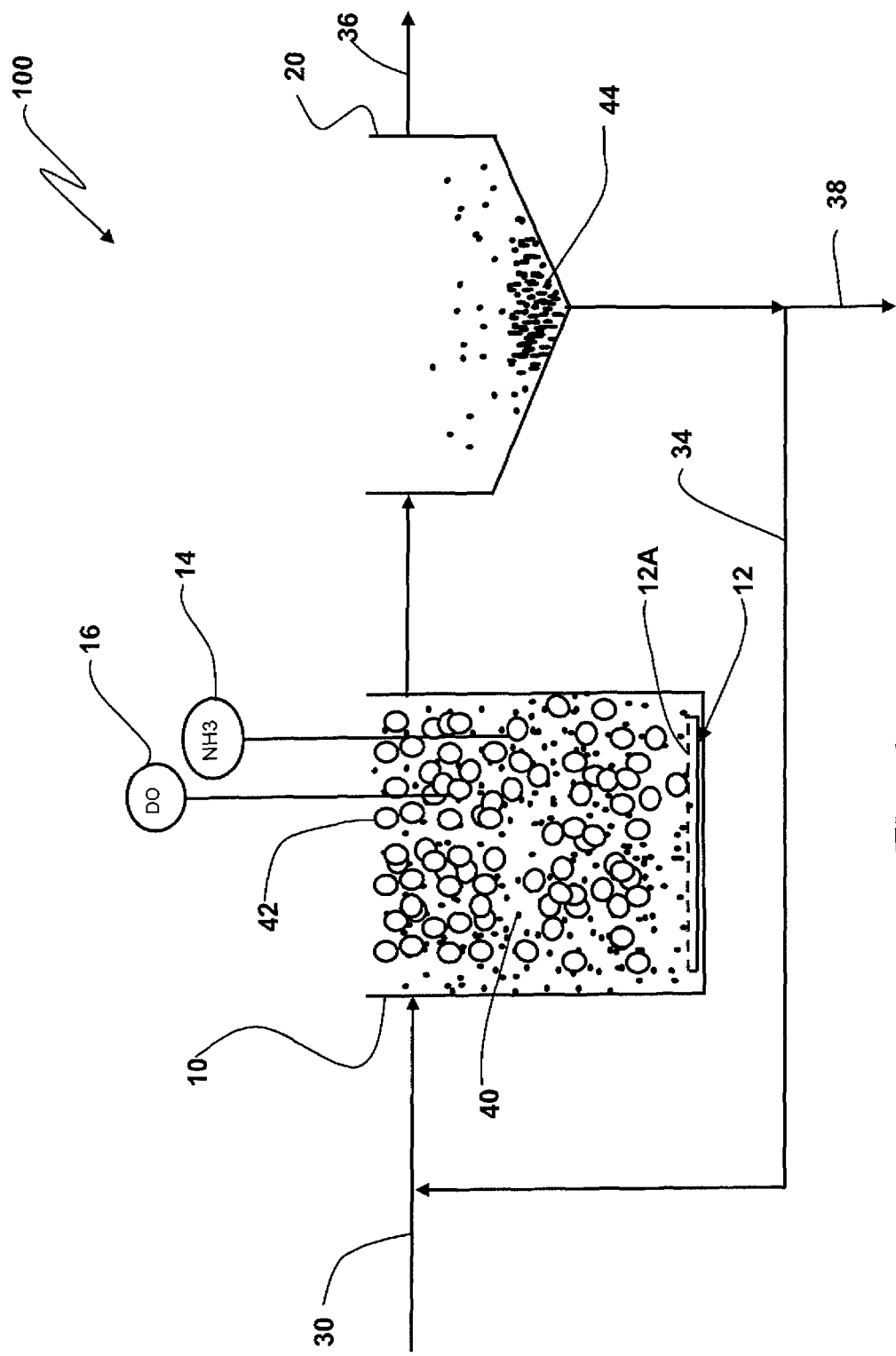
FIG. 1 is a schematic of a wastewater treatment plant in accordance with an embodiment of the present invention.
Figure 1A:
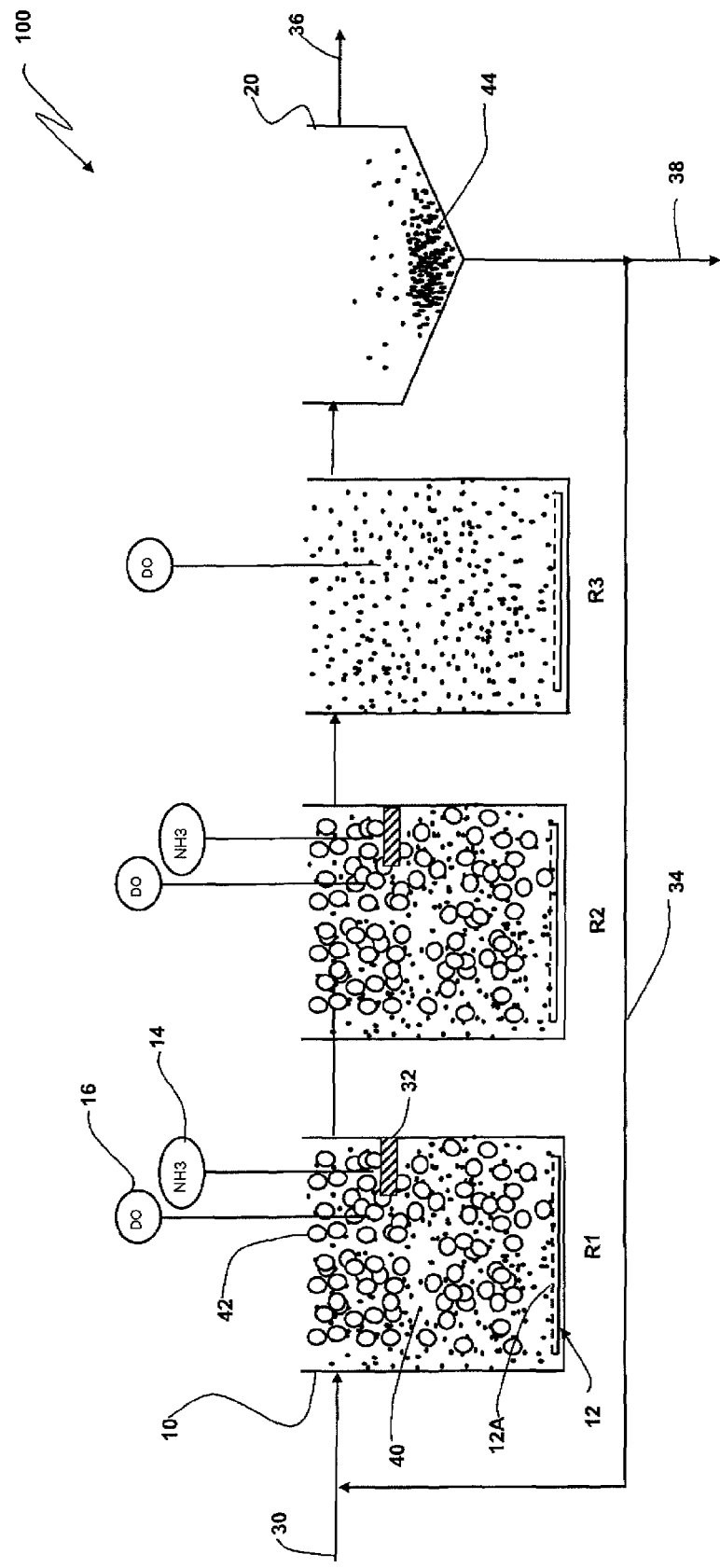
FIG. 1A is a schematic of a wastewater treatment plant in accordance with an alternate embodiment of the present invention.

The present invention relates to wastewater treatment processes to remove pollutants or contaminants from wastewater and generally to render the water cleaner and less harmful to the environment. Typical pollutants in wastewater, particularly municipal wastewater, comprise carbonaceous organics, organic N and ammonia. The present invention relates more specifically to biological treatment of wastewater as may be performed in a plant 100 illustrated schematically in FIG. 1. An influent wastewater stream 30 is biologically treated by passing through plant 100 to produce a clarified effluent stream 36. Plant 100 includes a reactor 10 and a clarifier 20 in fluid communication such that wastewater flows through reactor 10. Generally, reactor 10 is a portion of plant 100 where the biological treatment occurs. It is appreciated that more than one reactor may be used in a wastewater treatment plant as is shown in FIG. 1A. However, where biological treatment is a design objective, at least one reactor such as reactor 10 is included. Reactor 10 is designed to meet a specific objective of enabling and supporting biological treatment. Generally, plant 100 is designed such that wastewater, in passing through the plant, resides in reactor 10 for a selected period of time sufficient to meet the biological treatment objective of the reactor. Sensors 14 and 16, for example, may be deployed to provide for measuring process variables indicative of operating conditions of plant 10. While sensors 14, 16 are illustrated in FIG. 1 disposed in reactor 10, it is appreciated that one or more sensors can be disposed at any of various sites in plant 10 and be useful, perhaps in different ways, in assessing plant operation and the efficiency of the overall biological wastewater treatment process. See, for example, FIGS. 1A and 2.

Biological treatment of wastewater utilizes microorganisms or biomass to treat the wastewater. Microorganisms can perform a variety of treatment processes. Some microorganisms can remove BOD, while other microorganisms can perform nitrification, while others can perform denitrification. Furthermore, and in the way of an example, some microorganisms can be utilized in a wastewater treatment process to remove phosphorus.

The present invention entails a wastewater treatment process or system that utilizes an integrated fixed film activated sludge (IFAS) process. Here the microorganisms or biomass reside suspended in the mixed liquor that is typical in conventional activated sludge processes, and the biomass also resides on media or carriers 42. See FIG. 1. That is, the biomass in an IFAS process can be found suspended in the mixed liquor and on the carriers 42. As conditions such as temperature and the amount of substrate (organic loading) and loading of ammonia nitrogen change, the amount of biomass (nitrifying and organic substrate removing microorganisms) on the carriers 42 as well as in the mixed liquor can vary. During some periods, the amount of biomass or the density of the biomass on the carriers 42 is greater than at other times. For example, during seasonal warm weather there may be less biomass on the carriers 42 and there may be more nitrifying microorganisms suspended in the mixed liquor. Similarly, as temperatures become lower and there is a seasonal change to colder weather, the amount of nitrifying biomass in the mixed liquor may decrease. This change in population is not instantaneous. It usually occurs gradually. But the change in ammonia loading may change during the daily loading variations.

FIG. 1A illustrates another example of an IFAS process. In this example the process includes three reactors, R1, R2 and R3. Reactors R1 and R2 include the biofilm carriers 42 while reactor R3, located downstream from R1 and R2, does not include biofilm carriers. All three reactors in this example are aerated. Consistent with the present invention as described above, aeration may be intermittent (on/off) or varied for reactors R1 and R2 under conditions of low $NH_3$ loading and warm temperature. In such cases, as discussed before, most of the nitrification occurs in the suspended biomass. Again, it should be appreciated that the processes shown in FIGS. 1 and 1A are exemplary processes and that the concepts of the present invention can be applied in many biological wastewater treatment processes.

The present invention recognizes that biological activity exists in a wastewater treatment process with both the biomass in the mixed liquor and the biomass on the carriers 42. One principle that the present invention recognizes and appreciates is that at certain times and under certain conditions there may be more biological activity associated with the biomass in the mixed liquor than at other times. Likewise, at certain times and under certain conditions there may be more biological activity associated with the biomass on the carriers 42 than at other times. The present invention envisions a control process that is efficient and makes effective use of the biomass in the mixed liquor and on the carriers 42. One approach to controlling nitrification, for example, is to control the dissolved oxygen concentration in reactor 10 such that in one mode of operation, the primary biological activity that contributes to biological treatment emanates from the biomass in the mixed liquor. For example, when temperatures are relatively high during summer months, the wastewater treatment process described herein can function while maintaining the dissolved oxygen concentration relatively low. This, of course, requires less aeration which in turn reduces energy costs. Under such conditions, there is sufficient nitrifying biomass in the mixed liquor to perform adequate nitrification under conditions where the dissolved oxygen concentration is maintained relatively low. Under these conditions, individual carrier-filled reactors, as shown for example in FIG. 1A, may be intermittently aerated (implementing an air on/air off scenario) for fixed time periods while monitoring the $NH_4$ near the reactor discharge point. If a relatively long period of zero aeration is utilized, it may be necessary to include short aeration pulses within this overall period. Outlet screens 32 (FIG. 1A) can be positioned such that screen blockage due to media migration is minimized during carrier mixing-limited conditions, or alternatively, mechanical mixers can be utilized and operated during air-off periods. Even during these times where the dissolved oxygen concentration is maintained relatively low, the nitrifying biomass on the carriers 42 may still contribute to the total nitrification process. The contribution made by the biomass on the carriers 42 may be small compared to the contribution made by the biomass suspended in the mixed liquor. Such conditions will change and as an example, seasons will change and the wastewater treatment process will be exposed to colder temperatures or there might be sudden load increases. Over a period of time, as the wastewater temperature decreases, biomass concentrations in the mixed liquor will decrease and more biomass will grow on the carriers 42. When this occurs, there may be insufficient biomass in the mixed liquor to adequately nitrify within the mixed liquor alone at a relatively low dissolved oxygen concentration and the mass transfer limitations across the biofilms would limit the amount of nitrification which could potentially occur within the fixed film on the carriers. Hence, to perform adequate nitrification in the mixed liquor, the control system reacts by increasing the dissolved oxygen concentration to a relatively high dissolved oxygen concentration. In a separate mode of operation, the relatively high dissolved oxygen concentration causes the nitrifying biomass on the carriers 42 to significantly contribute to the nitrification process. It is postulated that at a relatively high dissolved oxygen concentration, that the nitrifying biomass in the second mode of operation will include substantially more nitrifying activity than was associated with the nitrifying biomass on the carriers 42 during the first mode of operation where the dissolved oxygen concentration was maintained at a relatively low concentration. In the second mode of operation where the dissolved oxygen concentration is maintained relatively high, both the biomass on the carriers and the biomass in the mixed liquor contribute to total nitrification.

There are numerous ways to control the wastewater treatment process described so as to efficiently use energy and effectively treat the wastewater. In the case of a nitrification process for example, the ammonia sensors 14 measure the concentration of ammonia in the mixed liquor in the reactor 10, or in a subsequent reactor. When the ammonia concentration exceeds a threshold value or falls outside of a target ammonia concentration range, the system can gradually increase aeration so as to raise the dissolved oxygen concentration in the reactor 10 sufficient to nitrify the mixed liquor in reactor. Likewise, when the ammonia concentration in the reactor is extremely low, then the control system can reduce aeration and hence reduce energy costs because such is unnecessary.

The ammonia level in incoming wastewater is known to vary, both diurnally and from season to season. Thus required net rate of nitrification can be affected by the changing concentration of ammonia in influent 30. Likewise, the temperature of the wastewater is known to have an effect on the rate of nitrification as well as an effect on the amount of ammonia in the wastewater. During relatively cold parts of the day or of the year, nitrification proceeds at a lower rate than during relatively warm parts of a day or warm periods of the year. Likewise, while wastewater is in transit to plant 10, for example, ammoniafication proceeds more slowly at lower temperatures than at higher temperatures.

Generally, for a given set of operating conditions, such as temperature, influent ammonia loading, and flow rate through plant 10, the rate at which ammonia is converted to nitrate is one indicator of the effectiveness of nitrification reactor 10. Those of ordinary skill in the operation of wastewater biological treatment plants are cognizant of, for example, how many pounds of ammonia must be converted per hour for generally acceptable operation. While influent ammonia loading and temperature may vary, it is commonly understood that there is a minimum net nitrification rate, below which the reactor 10 maybe deemed ineffective. For example, when operating at a relatively low dissolved oxygen concentration set point, nitrification is usually primarily performed by the biomass in the mixed liquor. When the ammonia concentration increases over a threshold or target level, or when the net nitrification rate falls below an established minimum, the control system will raise the dissolved oxygen concentration set point. When the dissolved oxygen concentration set point is raised, then this calls for additional aeration in order to raise the dissolved oxygen concentration in the reactor. The raising of the dissolved oxygen concentration set point will increase the dissolved oxygen concentration in the reactor and that will increase the nitrifying activity of the biomass on the carriers. Now, at this raised or elevated dissolved oxygen concentration set point, substantial nitrification is carried out by both the biomass in the mixed liquor and the biomass on the carriers.

Figure 3:
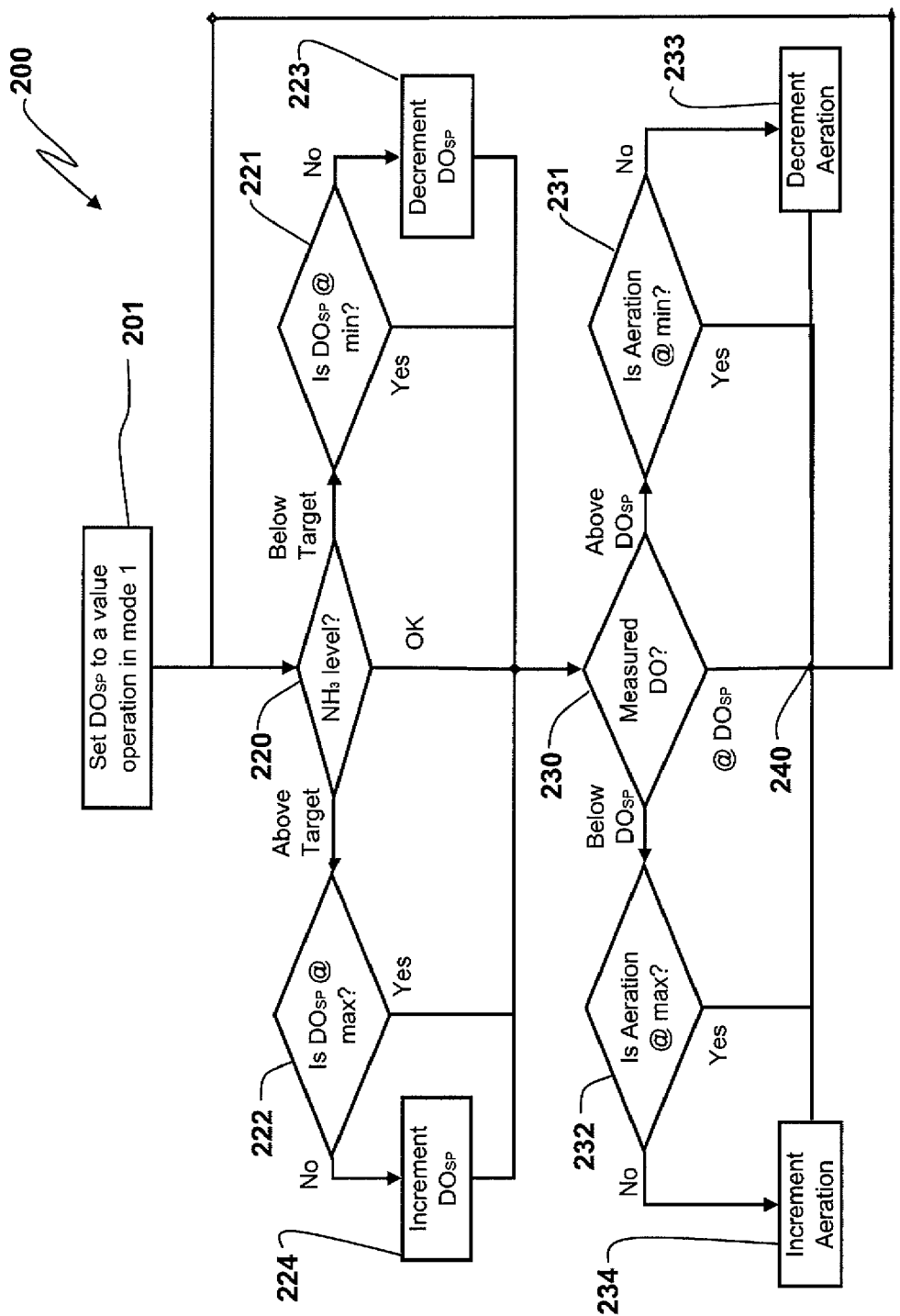
FIG. 3 is a flow chart describing exemplary control logic appropriate to the present invention.

There are numerous control approaches to controlling biological activity of the biomass to reduce and conserve energy. In FIG. 3, to be described later, there is disclosed a relatively sophisticated control process for nitrifying wastewater. However, a control approach can be relatively simple. A simple control approach is to have dissolved oxygen control based on ammonia measurement. The dissolved oxygen concentration is gradually increased or decreased based on the measured ammonia concentration in the reactor or in a subsequent reactor. The dissolved oxygen is increased by increasing aeration which generally increases mixing intensity in the reactor. Increasing the dissolved oxygen concentration and mixing intensity will increase the biological activity of the biomass on the carriers and this will in turn increase the contributions of the biomass on the carriers to the total biological treatment being performed.

Turning now to one specific exemplary embodiment of a control system operable to control a nitrification process as described above, there is shown in FIG. 3 a flow chart 200 that describes an exemplary control logic. It should be appreciated that there are numerous logic control schemes that can be employed, and that the logic control shown in FIG. 3 is simply one example. Before describing the logic, it is of use to discuss measured, calculated, and controlled variables and operating parameters associated with the control system and the plant. The measured variables are the ammonia concentration ($NH_3$) and the dissolved oxygen (DO) concentration expressed, for example in mg/l, in the wastewater. The values of the measured variables, $NH_3$ and DO, at any arbitrary time are acquired from sensors 14, 16 (or measured in a subsequent reactor) by conventional and well-known means. For purposes of discussing one exemplary approach, change in ammonia level for a given change in dissolved oxygen ($\Delta NH_3/\Delta DO$) can be used. The controlled variable is the aeration rate, AR, expressed, for example, in cfm of air flow. There are known ways to vary aeration. Aeration rate may be varied, for example, by an electronic control valve responding to a command signal from the control system in a conventional and well known manner.

Parameters are values that various variables may take on or may be limited or constrained by during the operation of the control system. The dissolved oxygen DO maybe continuously controlled by varying AR to keep the DO as close as practically possible to a set point value, $DO_{SP}$. There is a known first range for $DO_{SP}$ for operating in the first mode where nitrification is mainly or primarily carried out by the activated sludge 40. A second range for $DO_{SP}$ can be employed when it is desired to increase the nitrifying activity of the biomass on the carriers. These ranges are known based on experience by those skilled in wastewater treatment. The first range represents a practical range in which to vary DO and provide nitrification mainly or primarily due to the activated sludge 40. The second range represents a practical range in which to vary the dissolved oxygen concentration where the dissolved oxygen concentration is effective to increase the nitrifying activity of the biomass on the carriers 42 and increasing the mixing of the carriers into the total reactor volume. In the way of an example, the first dissolved oxygen set point may include a range of 0.5 mg/L to 2.0 mg/L. In this example, this dissolved oxygen concentration range will encourage substantial nitrifying activity from the biomass in the mixed liquor and which will result in the biomass in mixed liquor primarily contributing to nitrification. In this example, the dissolved oxygen set point for the second range is 2.5 mg/L to 5 mg/L. In this dissolved oxygen range, is it postulated that this dissolved oxygen range will increase nitrifying activity of the biomass on the carriers 42 and increase the mixing of the carriers into the total reactor volume such that in general, the biomass on the carriers will contribute significantly to nitrification. In this second dissolved oxygen set point range, it is believed that both the biomass in the mixed liquor and the biomass on the carriers will contribute significantly to total nitrification. These ranges are experience-based and may be determined based on, among other things, energy costs.

The ammonia concentration $NH_3$ has a target value which is an objective of the wastewater nitrification process. This is generally the level to which it is desired to reduce the ammonia concentration before the wastewater moves to a subsequent stage in the treatment plant. The target value of $NH_3$ may be based on effluent requirements or legal limits for returning treated water to a river or basin. A typical target range for ammonia is 0.2-10 mg/L.

In one exemplary embodiment, a minimum value of the net nitrification rate for the first mode to remain selected is an experience-based value based on characteristics of the activated sludge and the cost of aeration. Oppositely, a maximum value of net nitrification rate for the second mode to remain selected generally exists, and the value is likewise experience based and based at least partly on the cost of aeration. The control system, then operates with the objective of keeping net nitrification rate between a minimum value, and the maximum value in order to achieve the desired ammonia level in the effluent.

There is a minimum aeration rate obtainable with whatever aeration system is implemented. In general the minimum aeration rate is 0 or near 0 cfm. Likewise, there could be a maximum aeration rate associated with the particular aeration system utilized.

The control system is depicted in the exemplary flow chart of FIG. 3. There are many different ways in which the logic can be designed. What follows is simply one exemplary approach. Once initialized (block 201), the control system is designed to operate in a cyclic fashion wherein a cycle begins at block 210. The measurements and control responses called for beginning with block 210 are executed to reach point 240, and the cycle ends by returning to block 210. The time required for one cycle is time step $\delta T$. $DO_{SP}$ and AR are potentially changed in each step by incrementing or decrementing by a fixed value or step, $\delta DO_{SP}$ and $\delta AR$, respectively. Step values $\delta T$, $\delta DO_{SP}$, and $\delta AR$ values can be adjusted for stability and responsiveness of the control system by well known control system methods. Typical values for these control variables and parameters are well known and appreciated by those skilled in the art, and it is appreciated that various values can be employed depending on circumstances and conditions surrounding treatment.

Returning now to FIG. 3 and considering the control logic or strategy, an initialization step 201 is provided to start the control system working. The initialization adjustment step is followed by a dissolved oxygen set point adjustment step that commences with block 220 to adjust the dissolved oxygen set point according to the current ammonia level in the wastewater. The dissolved oxygen set point step is followed by the aeration level adjustment step, which begins with block 230 and ends at point 240 from whence control passes for the next time step back to the dissolved oxygen set point step at block 220.

Initialization step, block 201, is only executed at a startup of the control system. In this step, through operator entry or other means of entry, the various parameters of the plant and the control system as described here are entered.

After completion of the initialization step, control passes to the dissolved oxygen set point adjustment step, commencing with block 220. The current ammonia level is sensed and compared to the ammonia target for the treatment occurring in reactor 10. If the ammonia level is above the target level, control passes to block 222 where the current dissolved oxygen set point is compared to the maximum allowable dissolved oxygen set points. If the dissolved oxygen set point is not maximized, it is incremented, or increased, by the parameter, $\delta DO_{SP}$. If the dissolved oxygen set point is maximized, no control action is taken and control passes to the aeration adjustment step.

Returning now to block 220, if the ammonia level is below the target, control passes to block 221 where the current dissolved oxygen set point is compared to the minimum allowable dissolved oxygen set point. If the dissolved oxygen set point is not minimized, it is decremented, or decreased, by the parameter, $\delta DO_{SP}$, block 223. If the dissolved oxygen set point is minimized, no control action is taken and control passes to the aeration adjustment step.

The aeration adjustment step begins with block 230 where the currently measured dissolved oxygen in the wastewater is compared with the current dissolved oxygen set point. If the currently measured dissolved oxygen is below the current set point value, control passes to block 232, and if the measured dissolved oxygen is above the current set point, control passes to block 231. If the dissolved oxygen set point is at the set point, no control action occurs as a result of the block 230 decisions. When control passes to block 232, the current aeration level is compared to the value that was set as the maximum allowable or obtainable aeration level. If aeration is not maximized, the aeration is incremented by the amount $\delta AR$ (block 234) and control passes to the next dissolved oxygen set point step at block 220. If aeration is already maximized, no control action results and control passes to block 220. When control passes to block 231, the current aeration level is compared to the value that was set as the minimum allowable or obtainable aeration level. If aeration is not minimized, the aeration is decremented by the amount $\delta AR$ (block 233) and control passes to the next dissolved oxygen set point step at block 220. If aeration is already minimized, no control action results and control passes to the next dissolved oxygen set point step at block 220.

It is recognized that, as is well known by those skilled in control system design, any control decision based on comparing a variable value and determining if, for example, the value is equal to a specific set point or target value involves numerical tolerances. Such comparisons are to be implemented by using small tolerances about the actual desired set point value to avoid instability. When, for example, the measured dissolved oxygen is compared to a target level, it is to be considered equal to the set point level it if is within plus or minus a very small range about the set point value. It is well within the skill of the ordinarily skilled artisan to set these small comparison ranges, sometimes called deltas.

In the control logic shown in FIG. 3, it is appreciated that the first level of control looks at $NH_3$ levels and determines if the DO set point should be raised or lowered. Then, in the succeeding second level, the control logic looks at measured DO and determines if the aeration should be increased or decreased. It is appreciated that this order could be reversed. For example, the section of the control logic directed at determining if the DO set point should be raised or lowered could be at the second level while the determination whether aeration should be increased or decreased could occur at the first level. Many variations of this type can be implemented.

The present invention has been described in the context of a nitrification process. However, it should be understood and appreciated that the present invention can be utilized in various types of biological wastewater treatment processes including, but not limited to, BOD removal, phosphorous removal, and denitrification. Further, the process shown in FIG. 1 is a simple single train process. It is appreciated that the present invention can be incorporated into a multi-train process for a wide variety of biological wastewater treatment processes. In such a multi-train configuration, illustrated in FIG. 2, process variables such as dissolved oxygen, ammonia concentration can be monitored at various locations in the trains. If the trains are producing a common effluent, process variables can be monitored in the common effluent.

Figure 2:
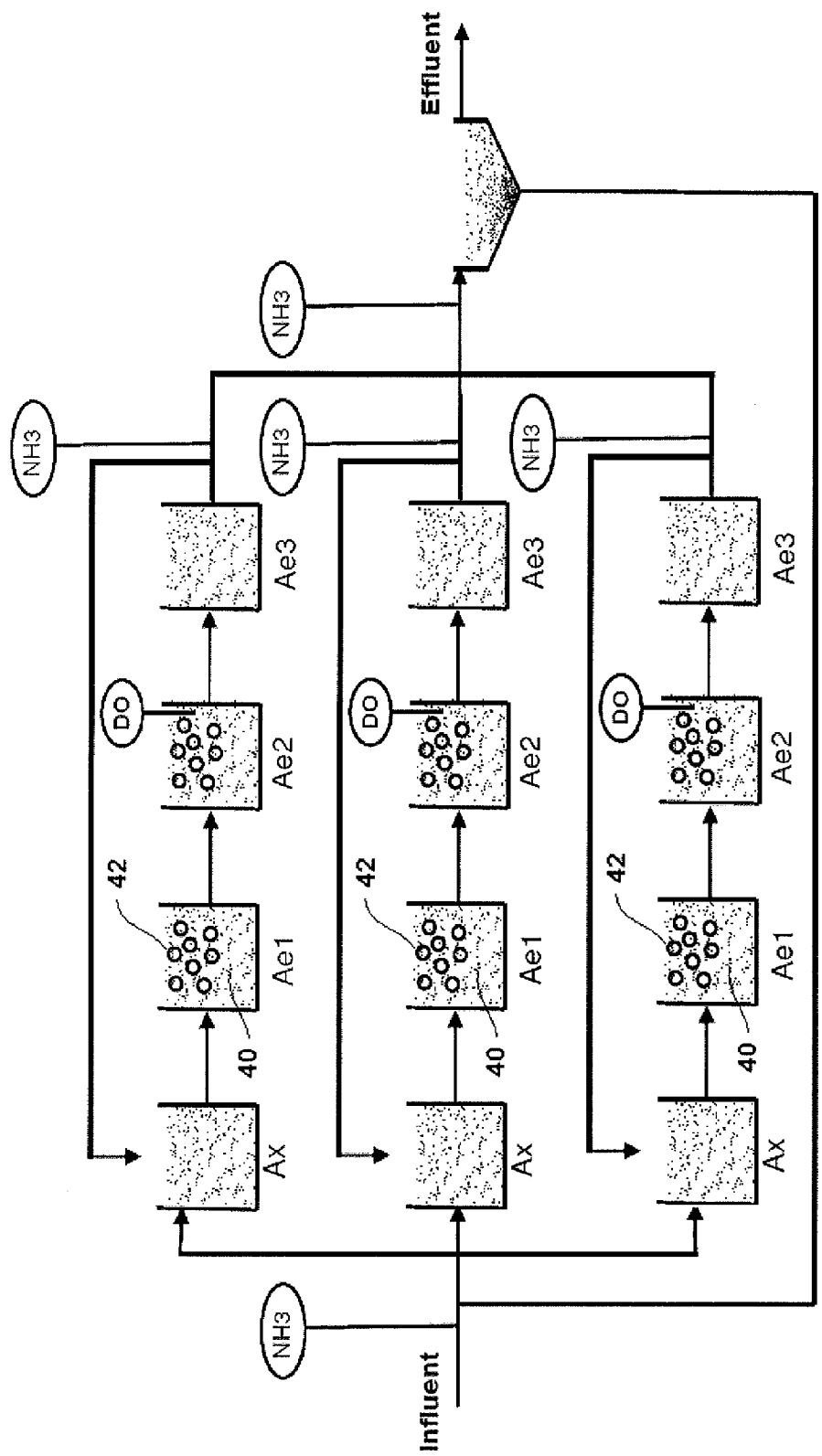
FIG. 2 is a schematic of a wastewater treatment plant in accordance with a multi-train embodiment of the present invention.

In the exemplary system and process shown in FIG. 2, there are shown three separate process trains that are operatively associated. The basic principles and concepts discussed with respect to the systems and processes shown in FIGS. 1 and 1A apply here. In the case of the individual trains shown in FIG. 2, each train includes four reactors, an anoxic reactor Ax followed by three aerobic reactors, Ae1, Ae2 and Ae3. Various monitoring approaches can be implemented for such process trains. As illustrated in FIG. 2, $NH_3$ is monitored before the influent is directed into each of the trains and $NH_3$ is also monitored in the final effluent that is taken from all three trains. In addition, $NH_3$ is monitored in the effluent from each train, before the respective effluents are combined. Finally, in this example, dissolved oxygen concentration is measured or monitored in the second aerobic reactor Ae2 in each train.

In FIG. 1, it is appreciated that during the first mode of operation, that the biofilm carriers 42 may have a tendency to accumulate about the surface of the wastewater. In addition, the biofilm carriers 42 may have a tendency to accumulate at the outlet of the reactor 10, and in some cases it may be possible that the biofilm carriers 42 could inhibit or restrict the flow of wastewater through the outlet of the reactor 10 and to the clarifier 20. Therefore, to reduce this tendency, the present invention could provide means in the area of the reactor outlet to prevent the biofilm carriers 42 from restricting or inhibiting the flow of wastewater through this area. One such means is the provision of an air distribution means near the outlet of the reactor that would disburse air into this area and effectively prevent the biofilm carriers 42 from accumulating in the outlet area. The amount of air distributed in this area could be controlled such that it would not impact the basic control concerning operation in the first and second modes. That is, the air supplied here would be controlled such that when the system was operating in the first mode of operation, that this particular amount of air would not substantially activate the microorganisms associated with the biofilm carriers 42. Another approach to dealing with this concern is to provide outlets in the lower portion of the reactor 10. In this case, the biofilm carriers, at least in the first mode of operation, would not inhibit the flow of wastewater through such lower disposed outlets.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of biologically treating wastewater utilizing an integrated fixed film activated sludge process, the method comprising:
mixing the wastewater with activated sludge to form mixed liquor;
biologically treating the mixed liquor in a reactor utilizing an integrated fixed film activated sludge process that includes biomass on carriers and biomass suspended in the mixed liquor;
wherein from time-to-time, depending on conditions in the reactor, the amount of biomass on the carriers varies; and
controlling the dissolved oxygen concentration in the reactor by maintaining a relatively low dissolved oxygen concentration in the reactor when the amount of biomass on the carriers is relatively low, and maintaining a relatively high dissolved oxygen concentration in the reactor when the amount of biomass on the carriers is relatively high.

2. The method of claim 1 wherein when the dissolved oxygen concentration is maintained at a relatively low concentration, a majority of the biological treatment is performed by the biomass in the mixed liquor and less than a majority of the biological treatment is performed by the biomass on the carriers; and wherein when the dissolved oxygen concentration is maintained at a relatively high concentration, the biomass on the carriers contribute more to the biological treatment of the wastewater than when the dissolved oxygen concentration was maintained at a relatively low concentration.

3. The method of claim 1 including controlling the dissolved oxygen concentration in the reactor such that when the dissolved oxygen concentration is relatively low the biomass on the carriers contribute less than 50% of the total biological activity in the reactor and wherein, when the dissolved oxygen concentration is relatively high the biomass on the carriers contribute more than 50% of the biological activity in the reactor.

4. The method of claim 1 including determining the effectiveness of the biological treatment in the reactor, and based on the determined effectiveness of the biological treatment, maintaining the dissolved oxygen concentration in the reactor at a relatively low or relatively high concentration.

5. The method of claim 1 wherein the method is carried out in first and second modes of operation wherein in the first mode of operation the dissolved oxygen concentration is maintained relatively low and in the second mode of operation the dissolve oxygen concentration is maintained relatively high, and wherein the method includes shifting from the first mode of operation to the second mode of operation and vice versa based on the dissolved oxygen concentration in the mixed liquor, the ammonia concentration in the mixed liquor, or the nitrification rate occurring in the mixed liquor.

6. The method of claim 5 including establishing a dissolved oxygen concentration set point range for each mode of operation, and varying the dissolved oxygen concentration set point within the respective ranges while biologically treating the wastewater.

7. The method of claim 1 including aerating the mixed liquor in the reactor and varying the aeration of the mixed liquor based in part at least on ammonia concentration within the reactor.

8. The method of claim 7 wherein in a first mode of operation the dissolved oxygen concentration in the reactor is maintained relatively low and in a second mode of operation the dissolved oxygen concentration in the reactor is maintained relatively high, and wherein in the first mode of operation the method includes providing a relatively low level of aeration to the reactor, and in the second mode of operation providing a relatively high level of aeration to the reactor.

9. The method of claim 8 wherein the method is a nitrification process and wherein in the first mode of operation nitrification is primarily carried out by the biomass in the mixed liquor while the biomass on the carriers contribute less to nitrification than the biomass in the mixed liquor.

10. The method of claim 9 wherein in the second mode of operation, the biomass on the carriers contributes substantially to nitrification and contributes more to nitrification than in the first mode of operation.

11. The method of claim 8 wherein in the first mode of operation the method includes supplying aeration to the reactor such that the carriers are not substantially mixed with the mixed liquor in the reactor; and in the second mode of operation, supplying aeration to the reactor such that the carriers are substantially mixed with the mixed liquor in the reactor.

12. The method of claim 1 including when the ambient temperature is relatively high over a selected period of time, maintaining the dissolved oxygen concentration relatively low; and when the ambient temperature is relatively low over a selected period of time maintaining the dissolved oxygen concentration relatively high.

13. The method of claim 1 including treating the wastewater in a first mode of operation during a relatively warm weather period; and treating the wastewater in a second mode of operation in a relatively cold weather period; and wherein in the first mode of operation the dissolved oxygen concentration in the reactor is maintained relatively low, and in the second mode of operation the dissolved oxygen concentration in the reactor is maintained generally high.

14. A method of efficiently nitrifying wastewater with an integrated fixed film activated sludge process, the method comprising:
mixing the wastewater with activated sludge to form mixed liquor;
nitrifying the mixed liquor in a reactor utilizing the integrated fixed film activated sludge process that includes biomass on carriers and biomass suspended in mixed liquor;
varying the nitrifying activity of the biomass in the mixed liquor and the biomass on the carriers by varying the dissolved oxygen concentration in the reactor;
in the first mode of operation, causing the nitrifying activity of biomass in the mixed liquor to contribute more to the total nitrifying activity in the reactor than the biomass on the carriers by maintaining the dissolved oxygen concentration in the reactor at a relatively low concentrations;
in a second mode of operation, increasing the nitrifying activity of the biomass on the carriers and causing the biomass on the carriers to contribute more to the total nitrifying activity in the reactor than the biomass on the carriers contributed in the first mode of operation by maintaining the dissolved oxygen concentration in the reactor at a relatively high concentration; and
wherein in the first mode of operation, the biomass in the mixed liquor contributes primarily to nitrification and in the second mode of operation, both the biomass in the mixed liquor and the biomass on the carriers contribute to nitrification.

15. The method of claim 14 wherein maintaining the dissolved oxygen concentrations in the reactor at relatively low and high concentrations includes providing aeration to the reactor and varying the aeration to the reactor such that in the first mode of operation, the dissolved oxygen concentration in the reactor is relatively low and in the second mode of operation, the dissolved oxygen concentration in the reactor is relatively high.

16. The method of claim 14 wherein in the first mode of operation, the biomass in the mixed liquor contributes the majority of the nitrifying activity that takes place in the reactor, and wherein in the second mode of operation the nitrifying activity of the biomass on the carriers is substantially increased over the level of nitrifying activity of the biomass on the carriers in the first mode of operation.

17. The method of claim 14 wherein maintaining the dissolved oxygen concentration at the relatively low or high concentration includes: (1) measuring ammonia concentration in the reactor; (2) comparing the measured ammonia concentration in the reactor to a target ammonia concentration or a target ammonia concentration range; and (3) if the measured ammonia concentration is not equal to the target ammonia concentration or lies outside of the target ammonia concentration range, the method includes raising or lowering the dissolved oxygen concentration accordingly.

18. The method of claim 17 including raising or lowering the dissolved oxygen concentration by varying aeration to the reactor.

19. A method of efficiently nitrifying wastewater with an integrated fixed film activated sludge process, the method comprising:
mixing the wastewater with activated sludge to form mixed liquor;
nitrifying the mixed liquor in the reactor utilizing an integrated fixed film activated sludge process that includes biomass on carriers and biomass suspended in the mixed liquor;
controlling nitrification such that a nitrification priority is given to the biomass suspended in the mixed liquor such that under certain conditions nitrification of the mixed liquor is primarily performed by the biomass in the mixed liquor;
maintaining the dissolved oxygen concentration in the reactor relatively low when nitrification is primarily performed by the biomass in the mixed liquor; and
in response to the method being unable to adequately nitrify the mixed liquor at the relatively low dissolved oxygen concentration, increasing the dissolved oxygen concentration in the reactor and maintaining the dissolved oxygen concentration relatively high in the reactor and increasing the nitrifying activity of the biomass on the carriers such that nitrification is carried out by both the biomass in the mixed liquor and the biomass on the carriers and wherein at the relatively high DO concentration, the biomass on the carriers contribute more nitrification than at the relatively low dissolved oxygen concentration.

20. The method of claim 19 including measuring the ammonia concentration at a selected location and controlling the dissolved oxygen concentration based on the measured ammonia concentration.

21. The method of claim 20 including measuring the ammonia concentration in the reactor and controlling the dissolved oxygen concentration in the reactor based on the measured ammonia concentration in the reactor.

22. The method of claim 1 wherein maintaining a relatively low dissolved oxygen concentration in the reactor occurs when the biomass suspended in the mixed liquor is able to perform the biological treatment and wherein maintaining a relatively high dissolved oxygen concentration in the reactor occurs when the biomass suspended in the mixed liquor is not able to perform the biological treatment.

23. The method of claim 1 wherein when organic and ammonia loading to the process is relatively low, the method includes maintaining a relatively low dissolved oxygen concentration in the reactor and wherein when the organic and ammonia loading to the process is relatively high, the method entails maintaining a relatively high dissolved oxygen concentration in the reactor.

24. The method of claim 1 wherein when the dissolved oxygen concentration is maintained relatively high, the method includes mixing the carriers in the wastewater such that the carriers are distributed in a substantial portion of the wastewater.

25. The method of claim 14 including causing the carriers to be more uniformly mixed in the wastewater during the second mode of operation than in the first mode of operation.

26. The method of claim 14 wherein the method includes providing aeration to the reactor and utilizing the aeration to mix the carrier with the wastewater.

27. The method of claim 19 wherein increasing the dissolved oxygen concentration in the reactor includes aerating the wastewater in the reactor and utilizing the aeration to mix the carriers in the wastewater.

* * * * *